Figure 3:
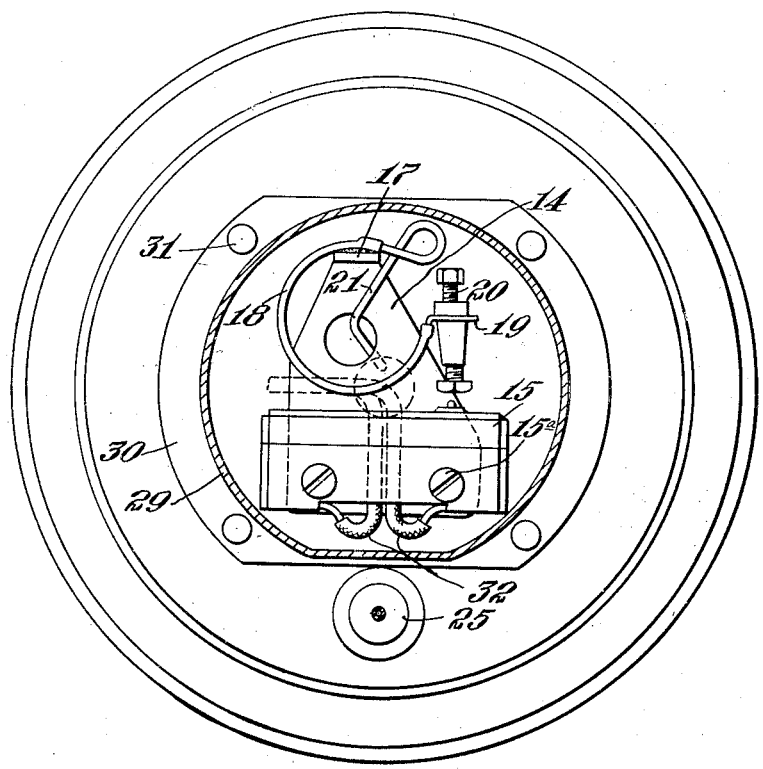

July 29, 1941.  E. H. HAMMOND  2,251,129
INDICATING INSTRUMENT
Filed Aug. 3, 1940  2 Sheets-Sheet 1
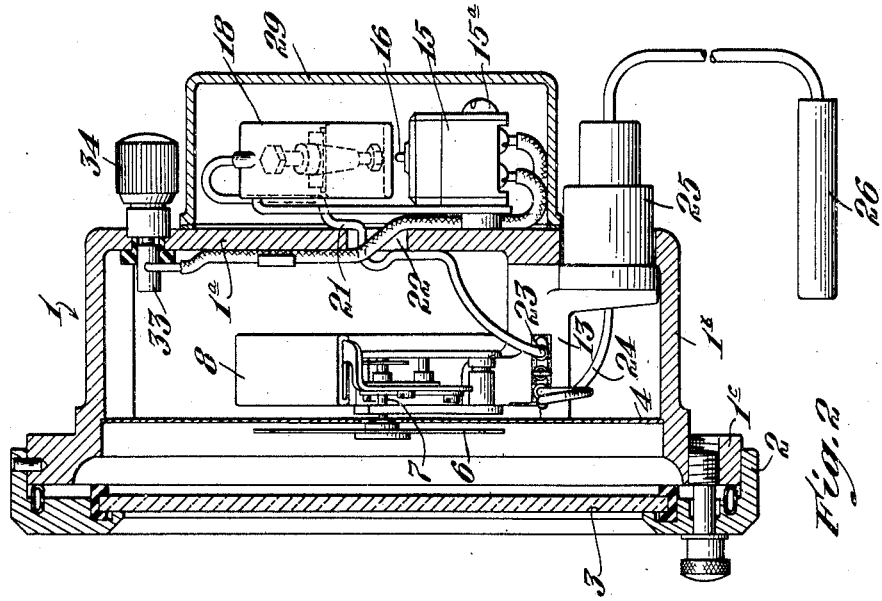
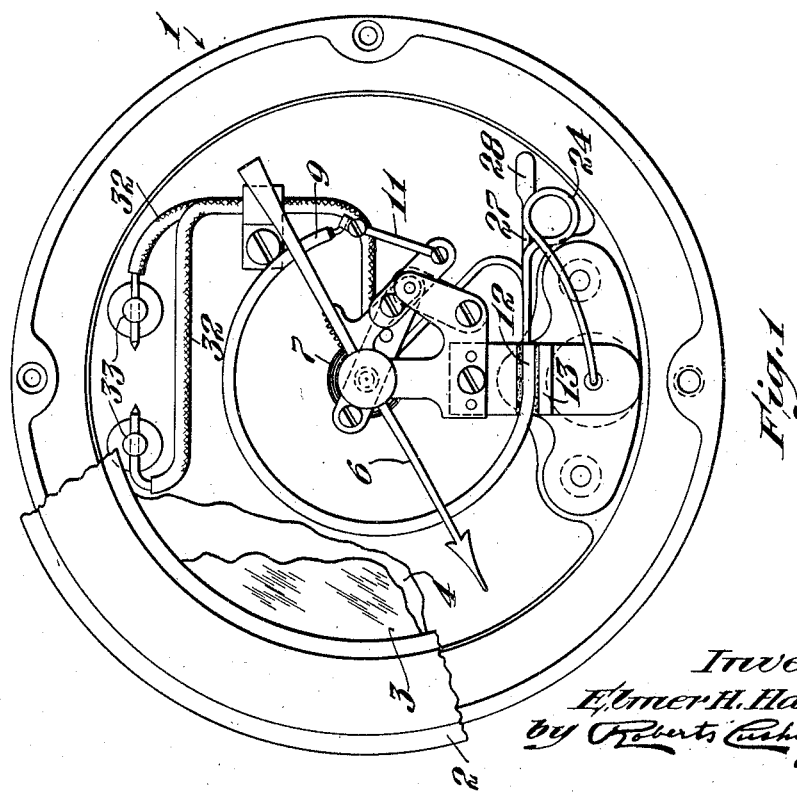
Inventor
Elmer H. Hammond
by Roberts Cushman Woodbury
Att'ys.

July 29, 1941.  E. H. HAMMOND  2,251,129
INDICATING INSTRUMENT
Filed Aug. 3, 1940  2 Sheets-Sheet 2

Inventor
Elmer H. Hammond
by Roberts Cushman & Woodberry
att'ys.

Patented July 29, 1941

2,251,129

UNITED STATES PATENT OFFICE 2,251,129

INDICATING INSTRUMENT

Elmer H. Hammond, Fairfield, Conn., assignor to Manning, Maxwell & Moore, Incorporated, New York, N. Y., a corporation of New Jersey Application August 3, 1940, Serial No. 350,613

2 Claims. (Cl. 200—56)

This invention relates to instruments, for example indicating thermostats, pressurestats or the like, wherein a pointer or index visually shows variations in temperature or pressure and wherein a switch acts to close or break an electrical circuit at a predetermined temperature or pressure.

Heretofore the association of the switch and the means for actuating it with the index mechanism has necessitated the employment of a housing or case of larger dimensions than is necessary for an instrument designed merely for visual indication of temperature or pressure changes. Moreover, in such combined instruments, the switch and its actuating means have commonly been located in the rear part of the case and behind the dial so that the switch is inaccessible for adjustment or repair except by removal of the casing cap, index, dial, and possibly other parts.

The principal object of the present invention is to provide a combined instrument comprising a visual index and its actuating means together with switch means of desirable type, but having the parts so designed and arranged that the diameter of the case need not exceed that which is necessary merely to house the index and the means for actuating the latter. A further object of the invention is to provide a combined instrument, for example an indicating thermostat, having the switch and its actuating means so arranged as to be easily accessible for adjustment or repair without removal of the dial or index and without interference with the continuous, normal operation of the index.

Other and further objects and advantages of the invention will be pointed out hereinafter in the following more detailed description and by reference to the accompanying drawings, wherein Fig. 1 is a front elevation of an instrument embodying the invention, portions of the removable front cap with its transparent panel and the dial being broken away in order to show the interior construction;

Fig. 2 is a rear elevation of the instrument of Fig. 1 with the switch casing shown in vertical section; and Fig. 3 is a vertical section substantialy on the line 3—3 of Fig. 1.

Referring to the drawings, the numeral 1 designates the case of the improved instrument, for example an indicating thermostat or pressurestat. This case has a rear wall 1ª and the substantially cylindrical side wall 1ᵇ, the latter having the radial flange 1ᶜ at its forward edge. To this flange is removably secured the cap ring 2 which carries the transparent panel 3 behind which is arranged the dial 4.

Cooperating with the dial is the movable index or pointer 6 mounted upon a staff 7 forming part of the movement mechanism which may be of conventional type and which receives its motion from a pressure motor, here shown as the Bourdon tube 8 whose tip 9 is connected by a link 11 to the movement mechanism. The other end of the Bourdon tube 8 is fixed at 12 to a bracket member 13 secured to the rear wall 1ª of the case at the inner side of the latter. Since, except for certain conduits and wires hereinafter described, the main case 1 contains only the parts usual to a simple indicating instrument, the main case may, if desired, be made of substantially the minimum dimensions necessary to house the indicating mechanism.

To the rear exterior surface of the case there is secured a support 14 (Fig. 3) which carries an electrical switch 15 of any desired type, the switch and the support being secured to the rear wall of the case by means of screws 15ª. The switch comprises an actuator 16 which may be depressed thereby either to close or to open the circuit through the switch, according to the design of the switch mechanism.

The support 14 also comprises a clamping portion 17 in which is clamped one end of a second Bourdon tube 18. As here illustrated, the tip of the tube 18 carries a bracket 19 having a screw-threaded opening for the adjustable contact screw 20 whose lower end is designed to contact the switch actuator 16 when the tube expands.

By adjusting the screw 20 in the bracket 19, it is possible to predetermine the point in the range of movement of the tip of the tube at which the switch will operate.

A conduit 21 leads from the fixed end of the tube 18 through an opening in the support 14 and inwardly through an opening 22 in the rear wall 1ª into the interior of the main case of the instrument, such conduit 21 leading into the fixed end 12 of the Bourdon tube 8 at the point 23. From the tube 8 there extends a conduit 24 which passes out through a tubular fitting 25 in the rear wall of the case and which leads to a fluid-containing bulb 26. A third conduit 27 (Fig. 1) may also lead from the fixed end of the tube 12 to a point within the casing, such conduit 27 providing convenient means whereby the Bourdon tubes 8 and 18, the conduits 21 and 24, and the pressure bulb 26 may be filled with a suitable expansive fluid, the tip 28 of the conduit 27 being sealed after the system comprising the tubes and the bulb has been filled with the fluid.

The switch 15 and its motor device 18 are normally housed within an auxiliary casing or cover 29 (Fig. 3), preferably provided with the attaching flange 30 having openings for the reception of screws 31 by means of which it is removably secured to the rear wall 1ª of the main casing. From the poles of the switch 15, conductors 32 extend inwardly through the opening 22 into the interior of the main casing where they are secured to the inner ends of binding posts 33 fixed in the rear wall 1ª of the casing and projecting rearwardly from said wall, where they are provided with appropriate thumb nuts 34 to facilitate the connection of electrical conductors to the instrument.

The instrument as illustrated, with its radial flange 1ᶜ, is designed for flush mounting upon a suitable panel with the auxiliary cover or casing 29 exposed and accessible at the rear of the panel. Thus by removing the cover or casing 29, it is possible to gain access to the switch 15 and Bourdon tube 18 so as to permit adjustment of said parts without in any way disturbing the cap 2 of the main case and without requiring removal of the dial 4 or any interference with the normal position and operation of the index 6. Thus, if it becomes necessary to adjust the switch mechanism, the instrument can continue uninterruptedly to indicate pressures or temperatures while such adjustment is being made so that there is no necessary interference with the continued operation or control of the apparatus with which the instrument is associated. This is a very decided advantage as compared with the usual combined instrument of this type in which it is necessary to put the entire instrument out of commission during periods in which adjustment of one or another of its parts is taking place.

The arrangement herein disclosed comprises the single source of pressure energy, to wit, the bulb 26, operative throughout the entire pressure or temperature range to move the index 6 over its graduated dial. On the other hand, the switch mechanism with its auxiliary independent pressure motor means 18 is only actuated by said energy source at a predetermined point in the range of pressure or temperature variations. Since the switch mechanism is provided with its own individual motor the energy necessary to actuate the switch does not affect the operation of the pointer 6 so that the latter may continue accurately to register changes in conditions even at that portion of the range at which the switch is set to operate.

While one desirable embodiment of the invention has hereby been shown by way of example, it is to be understood that the invention is not limited to this precise embodiment but is to be regarded as broadly inclusive of any and all modifications such as fall within the terms of the appended claims.

I claim:

1. An indicating thermostat or pressurestat comprising a case of substantially conventional type having integrally joined side and rear walls and which houses an index, a dial and pressure motor means for moving the index, the rear wall of the case having an aperture therein, switch means and a switch-actuating pressure motor secured to the exterior surface of the rear wall of the case so as to be accessible without disturbance of the dial or index, a fluid-containing bulb outside of the case, a conduit leading from said bulb to the index-actuating motor, a second conduit leading from the latter motor out through the aperture in the rear wall of the case to the switch-actuating motor, binding posts fixed to the rear wall of the case and accessible from the exterior of the case, and electrical conduits secured to the inner ends of said posts within the case and extending out through said aperture in the rear wall of the case to the switch terminals.

2. An instrument of the class described comprising a case having integrally joined side and rear walls and which houses an index, a dial and a Bourdon tube for moving the index, the rear wall of the case having an aperture therein, a switch and a Bourdon tube for actuating the switch, means securing the switch and its actuating tube to the exterior of the rear wall of the case, adjustable means for transmitting motion from the tip of the switch-actuating tube to the switch, a removable cover which normally houses the switch and its actuating tube, said cover having an attaching flange which normally engages the exterior surface of the rear wall of the case, a bulb exterior to the case, the conduit connecting the bulb with the fixed end of the index-actuating tube, and a conduit extending from the fixed end of the index-actuating tube out through the aperture in the rear wall of the case to the fixed end of the switch-actuating tube, the bulb, conduit and tube being filled with an expansive fluid.

ELMER H. HAMMOND.